(12) United States Patent
Machida et al.

(10) Patent No.: US 8,745,426 B2
(45) Date of Patent: Jun. 3, 2014

(54) INFORMATION PROCESSING APPARATUS AND POWER SAVING MEMORY MANAGEMENT METHOD WITH AN UPPER LIMIT OF TASK AREA UNITS THAT MAY BE SIMULTANEOUSLY POWERED

(75) Inventors: Shinichi Machida, Hiratsuka (JP); Satoshi Oguni, Yokohama (JP); Susumu Kajita, Ikoma (JP); Yuko Ishibashi, Machida (JP); Hitoshi Ueno, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 243 days.

(21) Appl. No.: 13/187,249

(22) Filed: Jul. 20, 2011

(65) Prior Publication Data
US 2012/0023349 A1    Jan. 26, 2012

(30) Foreign Application Priority Data

Jul. 22, 2010  (JP) ................................. 2010-165153

(51) Int. Cl.
G06F 1/26 (2006.01)
G06F 1/32 (2006.01)
G06F 1/00 (2006.01)
G06F 13/00 (2006.01)
G06F 13/28 (2006.01)

(52) U.S. Cl.
CPC ................ *G06F 1/3203* (2013.01); *G06F 1/26* (2013.01)
USPC ............ 713/320; 713/300; 711/104; 711/107

(58) Field of Classification Search
CPC ....................................................... G06F 1/3203
USPC .......................................................... 713/320
See application file for complete search history.

(56) References Cited

U.S. PATENT DOCUMENTS

| 2007/0094439 | A1* | 4/2007 | Kumar et al. | 711/103 |
| 2007/0208921 | A1* | 9/2007 | Hosouchi et al. | 711/170 |
| 2009/0125667 | A1  | 5/2009 | Hatasaki et al. | |
| 2009/0222620 | A1* | 9/2009 | Kanai | 711/104 |

FOREIGN PATENT DOCUMENTS

| JP | 2000-215100 | 8/2000 |
| JP | 2009-122733 | 6/2009 |

* cited by examiner

*Primary Examiner* — Thomas Lee
*Assistant Examiner* — Robert Cassity
(74) *Attorney, Agent, or Firm* — Foley & Lardner LLP

(57) ABSTRACT

An information processing apparatus has a task area unit as an area that executes a predetermined process, a power control unit that reads a task area to execute the process from the process and supplies power from a power source to the read task area, and a control unit that executes the process in the task area unit to which the power is supplied by the power control unit.

3 Claims, 3 Drawing Sheets

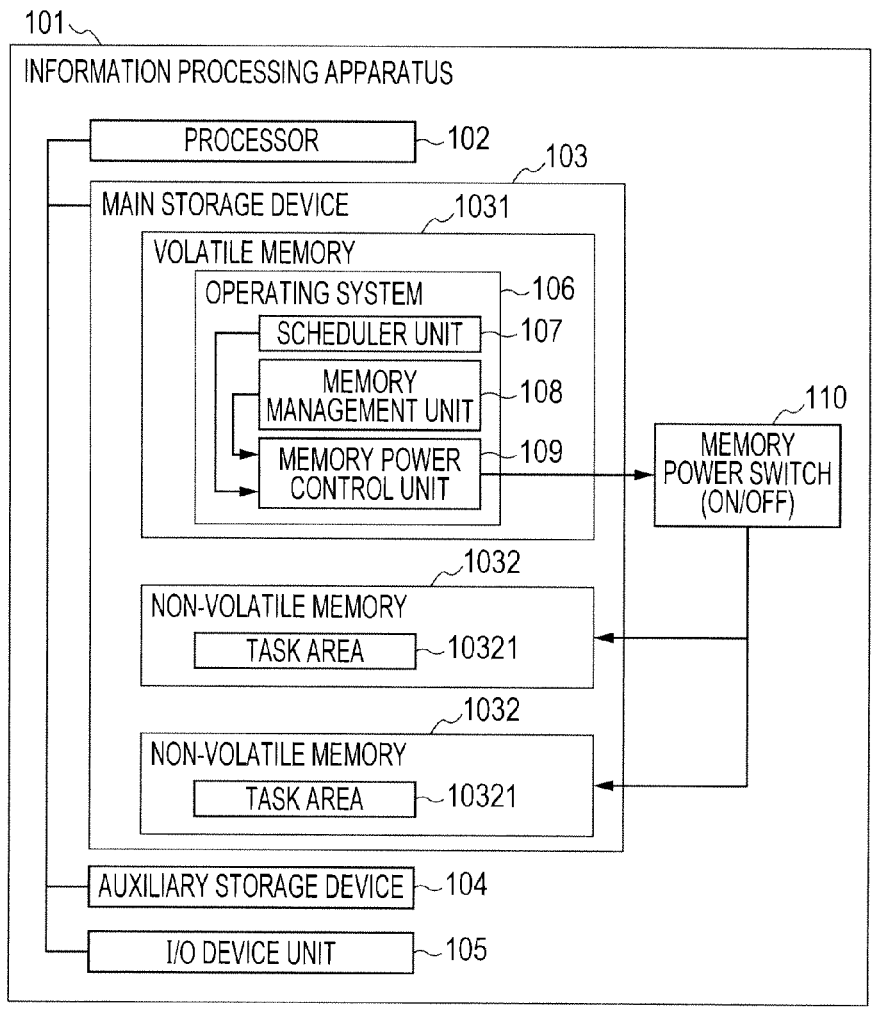

FIG. 4

| No | MEMORY POWER CONTROL REGION | POWER SUPPLY STATUS | REQUIRED POWER |
|---|---|---|---|
| 1 | MEMORY PART 1 | ON | 1 |
| 2 | MEMORY PART 2 | OFF | 0 |
| 3 | MEMORY PART 3 | ON | 1 |
| 4 | MEMORY PART 4 | ON | 1 |
| 5 | MEMORY PART 5 | OFF | 0 |
| 6 | MEMORY PART 6 | OFF | 0 |
| 7 | MEMORY PART 7 | OFF | 0 |
| 8 | MEMORY PART 8 | OFF | 0 |
| 9 | MEMORY PART 9 | OFF | 0 |
| 10 | MEMORY PART 10 | OFF | 0 |
| TOTAL | 10 PARTS | ON: 3 | 3 |

FIG. 5

| SLOT | MEMORY POWER CONTROL REGION | POWER SUPPLY STATUS | HEAT RELEASE VALUE (SINGLE UNIT) | HEAT RELEASE VALUE (TOTAL) |
|---|---|---|---|---|
| 1 | MEMORY PART 1 | ON | 1 | |
| 2 | MEMORY PART 2 | ON | 1 | 2 |
| 3 | MEMORY PART 3 | OFF | 0 | |
| 4 | MEMORY PART 4 | ON | 1 | |
| 5 | MEMORY PART 5 | ON | 0 | 2 |
| 6 | MEMORY PART 6 | OFF | 1 | |
| 7 | MEMORY PART 7 | ON | 0 | |
| 8 | MEMORY PART 8 | ON | 1 | 2 |
| 9 | MEMORY PART 9 | OFF | 1 | |

INFORMATION PROCESSING APPARATUS AND POWER SAVING MEMORY MANAGEMENT METHOD WITH AN UPPER LIMIT OF TASK AREA UNITS THAT MAY BE SIMULTANEOUSLY POWERED

CLAIM OF PRIORITY

The present application claims priority from Japanese application serial no. JP2010-165153, filed on Jul. 22, 2010, the content of which is hereby incorporated by reference into this application.

BACKGROUND OF THE INVENTION

The present invention relates to an information processing apparatus such as a server and a power saving memory management method for managing a memory of the information processing apparatus with saved power.

DESCRIPTION OF RELATED ART

In recent years, an information processing apparatus such as a server is provided with a large capacity memory by virtue of progress of an in-memory database and a virtualization technique to realize cost reduction and high-speed processing system. However, for the installation of a large capacity memory in an information processing apparatus, there is a problem of the limitation of the physical apparatus size by increment of memory installation space and the limitation of high-density packaging by the heat release amount of the memory.

Further, in the above-described information processing apparatus, when a large capacity memory is installed, the power consumption and heat release amount of the memory are increased, and enlargement of capacity in a power supply unit to supply power and improvement in a cooling system unit such as a FAN to discharge heat generated inside the apparatus to the outside are required. This disadvantage also causes a serious problem in the purpose of operating a general information processing apparatus. More particularly, the capacity of the power supply unit is increased, the physical space is increased due to improvement in the cooling system, and the power consumption is increased in accordance with the increase of the capacity and the physical space.

Japanese Published Unexamined Patent Application Nos. 2009-122733 and 2000-215100 disclose the following improvements. That is, a technique of dividing one information processing apparatus into plural units by the virtualization technique and using the units is known. Further, in the purpose of operating a general information processing apparatus, a method for temporarily evacuating a less-frequently used memory area to another area to delete memory power consumption is known.

When the above-described technique is used, power supply is controlled between an unused memory area in the divided memory and a divided and unused memory area in the divided memory, such that power supply to the unused memory area is stopped so as to suppress the power consumption. However, in the purpose of utilizing all the divided memory areas, this method is not always useful in the problem of heat release amount and reduction of power consumption of the information processing apparatus. Further, in the method of temporarily evacuating the less-frequently used memory area to another area, when the memory area is used again, it is necessary to load data from the evacuated area. This requires time, and is not advantageous in the reduction of power consumption. That is, it is impossible to appropriately supply power to a memory used in the information processing apparatus.

SUMMARY OF THE INVENTION

The present invention has been made in consideration of the above situation, and provides an information processing apparatus which appropriately supplies power to a memory used in the apparatus, and a power saving memory management method.

According to one aspect of the present invention, the present invention provides an information processing apparatus including: a task area unit as an area that executes a predetermined process; a power control unit that reads the task area unit to execute the process from the process and supplies power from a power source to the read task area; and a control unit that executes the process in the task area unit to which the power is supplied by the power control unit.

Further, the present invention provides a power saving memory management method performed in the above-described information processing apparatus.

According to the present invention, it is possible to provide an information processing apparatus which appropriately supplies power to a memory used in the apparatus, and a power saving memory management method.

BRIEF DESCRIPTION OF THE DRAWINGS

FIG. 1 is a block diagram showing a configuration of an information processing apparatus having a memory management system;

FIG. 2 illustrates an example of the structure of a memory power control table;

FIG. 4 is a table showing an example of plural nonvolatile memories when the upper limit of simultaneously power-supplied memory power supply regions is determined; and FIG. 5 is a table showing another example of plural nonvolatile memories when the arrangement of simultaneously power-supplied memory regions is optimized.

DETAILED DESCRIPTION OF THE PREFERRED EMBODIMENTS

Figure 3:
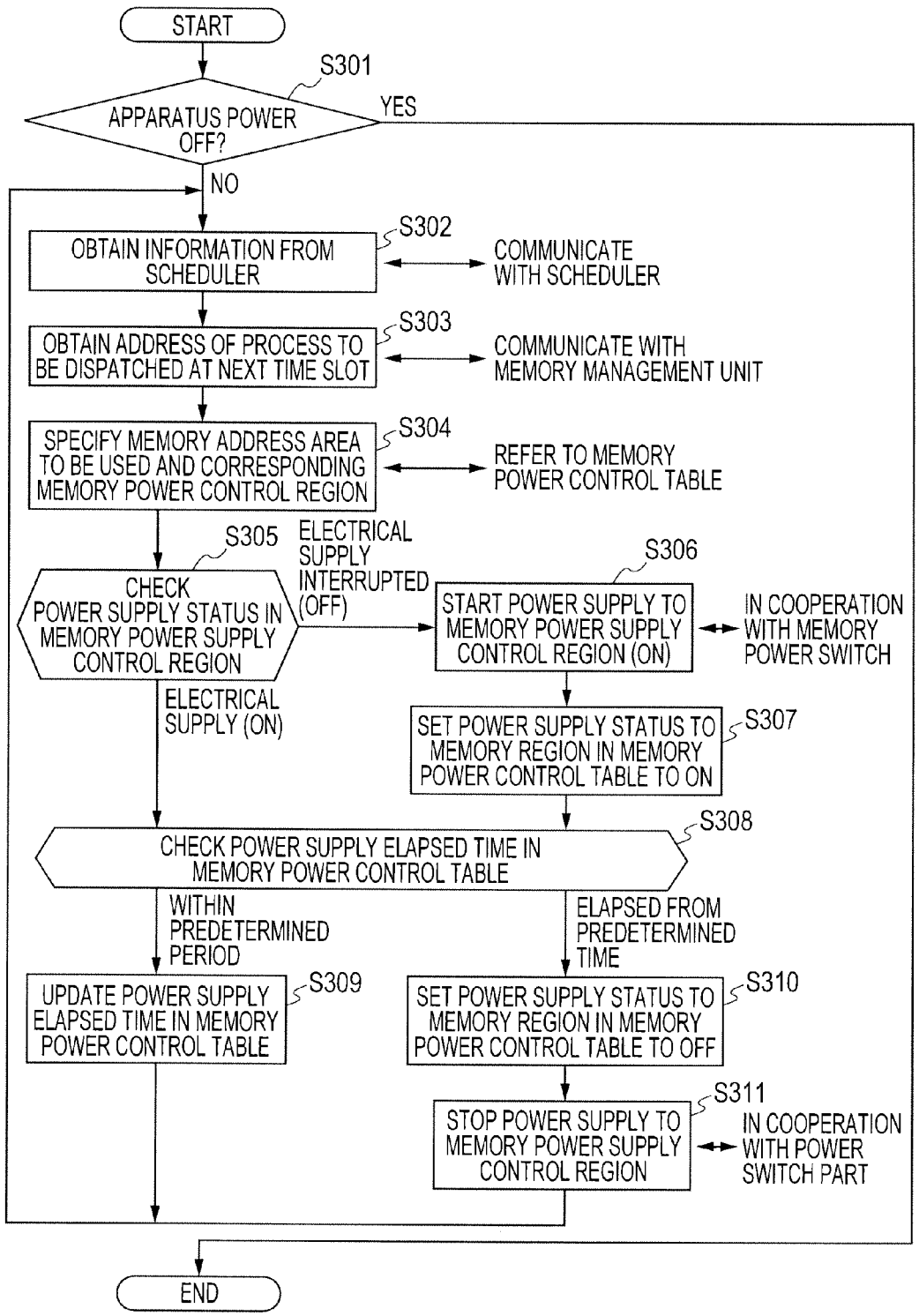
FIG. 3 is a flowchart showing a processing procedure of power control processing performed in the information processing apparatus.

Hereinbelow, a preferred embodiment of an information processing apparatus and power saving memory management method according to the present invention will be described in detail in accordance with the accompanying drawings. In the following description, as an example of the information processing apparatus, an apparatus to detect access to a memory provided in a server and control power supply to an accessed memory area is described. Further, the present invention is also applicable to power supply to a memory of various information processing apparatuses including a PC (Personal Computer) and a mobile terminal.

FIG. 1 is a block diagram showing a configuration of an information processing apparatus 101 having a memory management system in the present embodiment. As shown in FIG. 1, the information processing apparatus 101 has a processor 102, a main storage device 103, an auxiliary storage device 104, an I/O device unit 105 and a memory power switch 110. Further, the main storage device 103 has a volatile memory 1031, plural non-volatile memories 1032 and a memory power control table 1091. Note that the memory power control table 1091 has a non-volatile storage medium as in the case of the non-volatile memory 1032. Accordingly, a memory power control unit 109 to be described later can supply data on a memory before stoppage of power supply by power-off of the information processing apparatus 101 or the like to the memory and access the memory.

The volatile memory 1031 has an operating system 106. The operating system 106 controls the start and stop of the information processing apparatus 101 and the entire operation of the information processing apparatus 101. Further, the operating system 106 has a scheduler unit 107, a memory management unit 108 and the memory power control unit 109.

The scheduler unit 107 manages execution order and schedule of processes executed by the processor 102. The memory management unit 108 designates and secures a memory area used in a process. The memory power control unit 109 sends a signal (ON signal or OFF signal) indicating whether or not power is supplied to a memory area used in the process to the memory power switch 110. The memory power switch 110, connected to an external power source (not shown), switches the status of the externally supplied power source (supply status or supply stop status) based on the above-described ON signal or OFF signal.

More particularly, the memory power control unit 109 obtains information on the order of execution by the scheduler unit 107 and information on the memory area designated by the memory management unit 108. Further, the memory power control unit 109 detects access to the memory area, and notifies the memory power switch 110 of a non-volatile memory 1023 having a task area necessary for the access. The non-volatile memory 1032 has a task area 10321 for execution of various processes.

The processor 102 receives a task processing command from an operating system 106 on a volatile memory 1031 loaded to the main storage device 103, and performs execution/interrupt processing of the process. The auxiliary storage device 104 is a storage medium such as a hard disk device. The I/O device unit 105 is a communication medium such as a network interface or a recording medium such as a tape device.

Note that in the following description, the main storage device 103 has two non-volatile memories 1032, and performs control to supply power with each non-volatile memory 1032 as a unit. For example, it may be arranged such that, with these two non-volatile memories 1032 as one unit, power is supplied simultaneously to the two non-volatile memories 1032. In this manner, control may be performed with respect to a predetermined group. That is, as the power supply to the non-volatile memory 1032, power can be supplied to a power-supply controllable minimum region. Next, the memory power control table 1091 will be described.

FIG. 2 illustrates an example of the structure of the memory power control table 1091. As shown in FIG. 2, the memory power control table 1091 holds a memory address area 201, a memory power control region 202, a power supply status 203, power supply elapsed time 204, and an elapsed time threshold value 205, in association with each other.

The memory address area 201 is an address where the task area 10321 included in the non-volatile memory 1032 is positioned. Further, in the memory power control region 202, the task area 10321 positioned in the memory address area 201 is specified.

For example, in the example shown in FIG. 1, the two task areas 10321 indicate that the memory power control region 202 corresponds to "memory region 1" and "memory region 2" and the memory address area 201 in the respective memory regions are "0x0000-0x000f" and "0x0010-0x001f".

The power supply status 203 indicates whether or not power is supplied to the memory power control region 202. When power is supplied to the memory power control region 202, the power supply status 203 is "ON", while when power is not supplied to the memory power control region 202, the power supply status 203 is "OFF". As described later, the power supply status 203 is switched between the "ON" status and the "OFF" status by the memory power switch 110.

The power supply elapsed time 204 indicates time elapsed from the start of power supply to the memory power control region 202. As described later, the memory power control unit 109 measures time elapsed from the start of the power supply to the memory power control region 202, and stores the measured time as the power supply elapsed time 204. Note that in the following description, the memory power control unit 109 merely measures the time elapsed from the start of the power supply to the memory power control region 202. Actually, however, the time measurement is performed with a clocking device such as a counter in the memory power control unit 109.

The elapsed time threshold value 205 is a threshold value, which is used when the time elapsed from the start of the power supply to the memory power control region 202 becomes a predetermined time period, to stop the power supply. As described later, the memory power control unit 109 determines whether or not the time elapsed from the start of the power supply to the memory power control region 202 has exceeded the elapsed time threshold value 205, and when the memory power control unit 109 determines that the time has exceeded the elapsed time threshold value 205, the memory power control unit 109 stops the power supply to the memory power control region 202. Next, processing performed in the information processing apparatus 101 (power control processing) will be described.

FIG. 3 is a flowchart showing a processing procedure of the power control processing performed in the information processing apparatus 101. As shown in FIG. 3, first, the memory power control unit 109 determines whether or not the power of the information processing apparatus 101 is OFF (step S301). When the memory power control unit 109 determines that the power of the information processing apparatus 101 is OFF (Yes at step S301), the memory power control unit 109 terminates the power control processing shown in FIG. 3.

On the other hand, when the memory power control unit 109 determines that the power of the information processing apparatus 101 is not "OFF" (No at step S301), obtains information on the execution order and schedule of the process managed by the scheduler unit 107, and obtains a process to be dispatched at the next time slot scheduled by the scheduler unit 107 (step S302).

Then, the memory power control unit 109 refers to the memory management unit 108, obtains a memory address used in the process, and determines the memory address area 201 in FIG. 2 from the obtained memory address (step S303). For example, the memory power control unit 109 reads a memory address included in a command inside the process and used in the processing, compares the read memory address with the memory address area 201 shown in FIG. 2, and specifies a memory address area 201 including the read memory address.

Note that in the present embodiment, the memory power control unit 109 obtains a process to be dispatched at the next time slot scheduled by the scheduler unit 107. However, a predetermined time period is required from the start of the power supply to the non-volatile memory 1032 to a status where the memory is available. Accordingly, in consideration of this characteristic, it is possible to previously obtain a process for the time slot ahead by plural slots and read memory addresses included in the commands inside these processes and used in the processing, so as to determine a memory address area 201 to be previously utilized.

Next, the memory power control unit 109 refers to the memory power control table 1091, specifies a memory power control region 202 corresponding to the memory address area 201 specified at step S303 (step S304), checks the power supply status 203 corresponding to the specified memory power control region 202, and determines whether or not the power supply status 203 is "ON" or "OFF" (step S305). When the memory power control unit 109 determines that the power supply status 203 corresponding to the specified memory power control region 202 is "ON" (Yes at step S305), the process proceeds to step S308.

On the other hand, when the memory power control unit 109 determines that the power supply status 203 corresponding to the specified memory power control region 202 is "OFF" (No at step S305), the memory power control unit 109 issues a power feeding instruction to the memory power switch 110 so as to supply power to the memory power control region 202 (step S306), then, writes data indicating the "ON" status in the power supply status 203 of the memory power control table 1091 corresponding to the power-feeding instructed memory power control region 202, and sets the power supply elapsed time 204 to "0" (step S307).

Then the memory power control unit 109 checks the elapsed time of the power supply to the memory power control region 202 in the memory power control table 1091, and determines whether or not the elapsed time of the power supply to the memory power control region 202 exceeds the elapsed time threshold value 205 (step S308). When the memory power control unit 109 determines that the elapsed time of the power supply to the memory power control region 202 does not exceed the elapsed time threshold value 205 (within the predetermined time period) (No at step S308), the memory power control unit 109 resets the power supply elapsed time 204 in the memory power control table 1091 to the elapsed time (step S308).

On the other hand, when the memory power control unit 109 determines that the elapsed time of the power supply to the memory power control region 202 exceeds the elapsed time threshold value 205 (elapsed from the predetermined time) (Yes at step S308), the memory power control unit 109 sets the power supply status 203 in the memory power control table 1091 to "OFF", and sets the power supply elapsed time 204 to "0" (step S310), and issues an instruction to stop power to the memory power control region 202 to the memory power switch 110 (step S311). When this step S311 is completed, all the processing of the power control processing shown in FIG. 3 is completed.

By repeatedly performing the above respective steps, power is previously supplied to the memory power control region 202 accessed by the operating system 106, to enable reference/writing from the operating system to the memory. Regarding a not-accessed memory power control region 202, as power is not supplied and reference/writing from the operating system to the memory cannot be performed, significant power saving is attained in the memory system.

Note that regarding the definition of the predetermined period of time as a reference for determination at step S308, it may be arranged such that an administrator or the like does not independently determines the time, but one time slot period in a process performed by the information processing apparatus 101 is previously defined, then the memory power control unit 109 communicates with the scheduler unit 107 in the operating system 106 to obtain the status of the process being executed in the time slot, then determines whether or not the time has elapsed from the above-defined predetermined time and the status of the process is "end" or "interrupted". When the memory power control unit 109 determines the status of the process is "end" or "interrupted", the memory power control unit 109 immediately issues to the memory power switch 110 an instruction to stop the power supply to the memory power control region 202, to stop the power supply to the memory power control region 202 within a shorter period. Further, as a specific example of the above-described memory power control, management may be performed such that regarding a high-frequency accessed memory address area 201 (memory power control region 202), it is possible to set the status always to "ON".

In this manner, the task area 10321 as an area for execution of a predetermined process is provided, the memory power control unit 109 reads a process-executed task area 10321 from a command inside the process, then supplies power from the power source to the read task area 10321, and the processor 102 performs the process in the task area 10321 power-supplied by the memory power control unit 109. Thus power is appropriately supplied to the memory used in the information processing apparatus. For example, as power is supplied only to a necessary memory region in accordance with increment in memory capacity in the information processing apparatus, increment in the heat release amount and increment in the power consumption can be suppressed. Further, it is possible to detect access to the memory in the information processing apparatus and control power supply to the memory region in accordance with necessity. That is, since power supply is performed when memory access is required, the amount of power supply to the memory is suppressed, and a power saving system can be realized.

FIG. 4 is a table showing an example where plural non-volatile memories 1032 exist when the upper limit of simultaneously power-supplied memory power supply regions 202 is determined (modification of the memory power control table 1091). In the example shown in FIG. 4, ten power-supply controllable non-volatile memories 1032 are provided. By determining the number of simultaneously-power-supplied regions as three, the upper limit of the necessary power 402 can be suppressed to the power used by three non-volatile memories 1032. For example, the power supply load on a device to supply power to the non-volatile memories 1032 can be reduced and simplified from 10 to 3.

FIG. 5 is a table showing another example where plural nonvolatile memories 1032 exist when the arrangement of simultaneously power-supplied memory regions 202 is optimized (modification of the memory power control table 1091). In the example shown in FIG. 5, a slot 501 indicates a physical slot position of a non-volatile memory 1032, and a heat release value 502 indicates a heat release amount by slot. Further, in FIG. 5, the upper limit of a heat release value 503 as the total of heat release values of three continuous slots is defined as 2.

In the example shown in FIG. 5, the statuses of the memory power control regions 202 (memory region 1 and memory region corresponding to the slot 1 and the slot 2 are a power supplied status ("ON" status), and a heat release status (the heat release value is "1"). The heat release value of the slots 1 to 3 grouped as one group is "2" within the total heat release value 503. In this manner, in a memory system where the maximum heat release value is e.g. "3", by defining the upper limit "2" of the heat release value of the physically continuous three memory power control regions 202, the maximum heat release value of the memory system is "2". Thus the heat release value of the memory system can be suppressed and a high density memory packaging can be realized.

In this manner, by using the modification shown in FIG. 4 or FIG. 5, it is possible to achieve simplification of a power source device which is a power supply unit in the information processing apparatus and a cooling system such as a FAN and realize a power saving information processing apparatus. Further, it is possible to suppress the power consumption and heat release values of memories used at the same timing, and simplify e.g. a power supply unit such as a power source and a cooling system such as a FAN.

Further, in an information processing apparatus, in which e.g. an operating system which runs on a stand-by server in a hot stand-by system, monitoring software and the like are installed and which is used for a small processing amount, since power is supplied to a memory only at access timing, a sleep status can be maintained in a further power saving manner.

Note that the present invention is not limited to the above-described embodiment; however, the constituent elements may be modified and implemented without departing from the scope thereof. Further, various changes and modifications can be made by appropriate combinations of the plural constituent elements disclosed in the above embodiment. For example, some constituent elements may be deleted from the entire constituent elements shown in the embodiment. Further, the constituent elements in different embodiments may be arbitrarily combined.

What is claimed is:

1. An information processing apparatus comprising:
a task area unit as an area configured to execute a predetermined process;
a power control unit configured to read the task area unit to execute the process and to supply power from a power source to the read task area unit;
a control unit configured to execute the process in the task area unit to which the power is supplied by the power control unit;
a plurality of task area units, wherein the power control unit is configured to supply the power to only the task area unit read from the process among the plurality of task area units; and
a power control table configured to hold the plurality of task area units, a power supply status indicating whether or not each of the task area units is supplied with the power, and an upper limit of the number of the task area units simultaneously power-supplied, in association with each other,
wherein the power control unit is configured to supply the power to only the task area units in the number determined with the upper limit of the number of the task area units.

2. The information processing apparatus according to claim 1, wherein the task area unit has a non-volatile memory.

3. The information processing apparatus according to claim 1, further comprising: a schedule unit configured to determine execution order of the process, wherein the power control unit is configured to read the task area units from the respective processes in the order determined by the schedule unit, and to secure the task area before execution of the process.

* * * * *